United States Patent [19]

Papadopoulos

[11] Patent Number: 5,412,799
[45] Date of Patent: May 2, 1995

[54] EFFICIENT DATA PROCESSOR INSTRUMENTATION FOR SYSTEMATIC PROGRAM DEBUGGING AND DEVELOPMENT

[75] Inventor: Gregory M. Papadopoulos, Arlington, Mass.

[73] Assignee: Massachusetts Institute of Technology, Cambridge, Mass.

[21] Appl. No.: 41,908

[22] Filed: Apr. 2, 1993

Related U.S. Application Data

[63] Continuation of Ser. No. 486,061, Feb. 27, 1990, abandoned.

[51] Int. Cl.⁶ ............... G06F 15/82; G06F 11/34
[52] U.S. Cl. ............... 395/500; 364/232.22; 364/232.3; 364/948.3; 364/DIG. 1; 395/375
[58] Field of Search .......... 371/19; 395/375, 500

[56] References Cited

U.S. PATENT DOCUMENTS

| | | | |
|---|---|---|---|
| 4,814,978 | 3/1989 | Dennis | 364/200 |
| 4,845,615 | 7/1989 | Blasciak | 364/200 |
| 4,847,755 | 7/1989 | Momson et al. | 364/200 |
| 4,879,646 | 11/1989 | Iwasaki et al. | 364/200 |
| 4,885,684 | 12/1989 | Austin et al. | 364/200 |
| 4,989,145 | 1/1991 | Kyushima | 364/419 |
| 5,048,018 | 9/1991 | Bernstein et al. | 371/19 |
| 5,088,034 | 2/1992 | Ihara et al. | 395/700 |
| 5,146,594 | 9/1992 | Iitsuka | 395/700 |

OTHER PUBLICATIONS

Thomas E. Anderson et al, "Quartz: A Tool for Tuning Parallel Program Performance" ACM, Sep. 1989.

*Primary Examiner*—Ken S. Kim
*Attorney, Agent, or Firm*—Hamilton, Brooks, Smith & Reynolds

[57] ABSTRACT

A program is first analyzed in an ideal environment that assumes infinite processing resources and zero communication latency. In this environment, the program is viewed as being comprised of a plurality of steps of computation. Each step of computation is defined as the set of instructions that have all their operands available at that time. As such, each step of computation is limited only by data dependencies. The number of instructions executed for each step of computation is counted by the data processing system. The count of instructions may be used to produce an ideal parallelism profile that produces a graphical representation of the simulation. Having established an ideal level of parallelism in the ideal environment, a more realistic profile of the maximum level of parallelism may be obtained through analusis that accounts for a finite number of processors and for communication latency. This more realistic simulation is compared to the actual level of parallelism experienced when the program is executed. Should the comparison reveal room for improvement the program is tuned to resolve problems of work distribution and contention. of processors that process tokens; comprising the step of:

a) inserting in with other tokens barrier token that causes statistics maintained by the processors to be sampled and available for output;
b) processing the other tokens; and
c) processing the barrier token to generate the sampling of the statistics.

19 Claims, 5 Drawing Sheets

EFFICIENT DATA PROCESSOR INSTRUMENTATION FOR SYSTEMATIC PROGRAM DEBUGGING AND DEVELOPMENT

This is a continuation of application Ser. No. 07/486,061, filed on Feb. 27, 1990, now abandoned.

RELATED PATENT APPLICATION

The subject matter of this patent application is related to pending United States patent application, "Implementation of a General Purpose Data Flow Multiprocessor," by Papadopoulos et al., Ser. No. 07/274,498, filed on Nov. 18, 1988, now abandoned and U.S. patent application, "Tagged Token Data Processing System with Operand Matching in Activation Frames", by Papadopoulos et at., filed on Aug. 21, 1989 which is a continuation-in-part of the Ser. No. 07/274,498 application, is now issued U.S. Pat. No. 5,244,635. The present application and these related applications are all assigned to the Massachusetts Institute of Technology.

BACKGROUND OF THE INVENTION

Instrumentation provides a means of obtaining data relating to program performance and data useful in program analysis and debugging. The data retrieved by instrumentation is helpful to the programmer working with a parallel multiprocessor. Unfortunately, current efforts at instrumentation have been plagued with a difficult dilemma. They seek to monitor run-time behavior, but in so doing, they affect the run-time behavior of the parallel program being monitored. Thus, in order to properly instrument a system, programmers have had to pay the price of changing the true behavior of the system. This dilemma is akin to the proposition presented in the Heisenberg uncertainty principle which proposes that measurement of a system alters the behavior of the system.

Another problem presented by current instrumentation strategies is the usefulness of the information that is derived from such approaches. Often, only a single value (such as the total number of operations performed) is derived. Standing alone, such a value has little meaning because it reveals little about what can be improved and little about the maximum achievable level of parallelism that may be obtained. Hence, there is a need for a more useful systematic measurement technique.

SUMMARY OF THE INVENTION

The present invention provides a simulation strategy for determining a maximum amount of parallelism that is possible in the execution of a program. The maximum amount of parallelism may be determined for an ideal environment in which it is assumed that an infinite number of processors are available and that such processors experience no communication latency. In performing such a simulation, the data processing system directly executes the program in steps and counts the number of instructions that are executed for each step of the program. A step of computation constitutes all those instructions that may be executed at that point in the execution of the program. The resulting count of instructions for each step is plotted versus the step number to produce a graphical representation known as an ideal parallelism profile.

Analysis of the ideal parallelism profiles may be performed to account for a limited number of processors. As such, the steps of computation are redefined to account for the limited processing resources. When such a finite processor analysis is performed, the number of instructions in a step of computation is limited not only by availability of operands but also by the data processing systems ability to concurrently perform such instructions. Furthermore, analysis may be performed that accounts for communication latency between processors.

The simulations are performed by a data processing system having at least one processing element for executing instructions. The data processing system is preferably a data flow processing system as well as a multiple processor system. The at least one processing element should include a counter for counting a number of instructions that it executes. The data processing system should also comprise at least one token queue for storing tokens that trigger execution of instructions when processed by the processing element. The counter in the processing element counts the number of instructions performed during each step of computation of the program so as to determine a maximum achievable level of parallelism for the program. The information gathered need not be limited to merely a count, for the counter may be replaced with other statistics gathering components.

In one preferred embodiment there are two token queues provided for each processing element. To perform a simulation with this configuration, a first token queue in each processing element is filled with tokens to initiate a step of computation of the program. The tokens within the first token queues are processed. Any tokens generated during the course of processing are placed in second token queues. During this processing statistics are kept such as the number of instructions performed. A separate set of statistics are maintained for each step of computation. The first token queues are processed until they are empty at the completion of a step. Once all processors have completed a step, the newly generated tokens in the second queues comprise the tokens for the next step of computation. Hence, during the next step of computation the roles of the token queues are reversed. This toggling between token queues enables the data processing system to process as many steps of computation as required by the program being executed.

Although one embodiment utilizes two token queues for each processing element, it should be noted that in an alternative embodiment only one token queue is used. In this alternative embodiment the single token queue provides storage for all of the tokens used in steps of computations. Barrier tokens are placed after the tokens of each step. With processing of a barrier token, processing of tokens of the next step is prevented until all processors have completed the preceeding step. The barrier token also calls a subroutine that causes the statistics to be forwarded to a system location. Further, this subroutine prepares the queues for the next step of computation by swapping their roles. As such the queue that was formerly being dequeued is enqueued during the subsequent step and similarly, the queue formerly being enqueued is dequeued. This barrier token approach may, likewise, be used for a two token queue approach. Still further, the barrier tokens may be used as tracers that are placed in the stream of tokens to be processed to generate statistical information when needed.

The counts generated by this simulation process may provide valuable information. Further, they may be plotted to produce parallelism profiles. The ideal parallelism profile may be used to derive speed-up and utilization for non-ideal environments (i.e. for data processing systems having finite processing resources and/or communication latency).

The simulation strategies embodied within the present invention are useful in diagnosing performance difficulties. To properly diagnose performance difficulties, the maximum potential for parallelism of a program executed by the data processing system should be determined. Once this has been determined, an actual level of parallelism experienced during execution of the program is determined. Given these two levels of parallelism, a comparison between the two levels is performed to determine what can be done to heighten the parallelism of the program.

To ease the process of debugging, the tokens are stored for step computation in token queues of the data processing system and are processed as previously described. If an error occurs during execution of the program, the program is halted at the end of the processing step in which the error occurred. This halting aids in determinate execution of the program and also provides the programmer with useful information as to what may have caused the error.

An additional benefit of the instrumentation strategy of the present invention is an ability to discern instruction mixes of subsets of token approach. In particular, each subset of instructions is assigned a unique color. This color is encoded in a field of the instructions in each of the subsets. When the instructions are executed, instead of merely counting the number of instructions executed, the system counts the number of instructions of each color that are executed. There is a counter associated with each color of instruction. As a result, separate counts can be maintained for each colored subset of the instructions; thereby producing more valuable data as to the instruction mixes.

DETAILED DESCRIPTION OF THE PREFERRED EMBODIMENT

Figure 1:
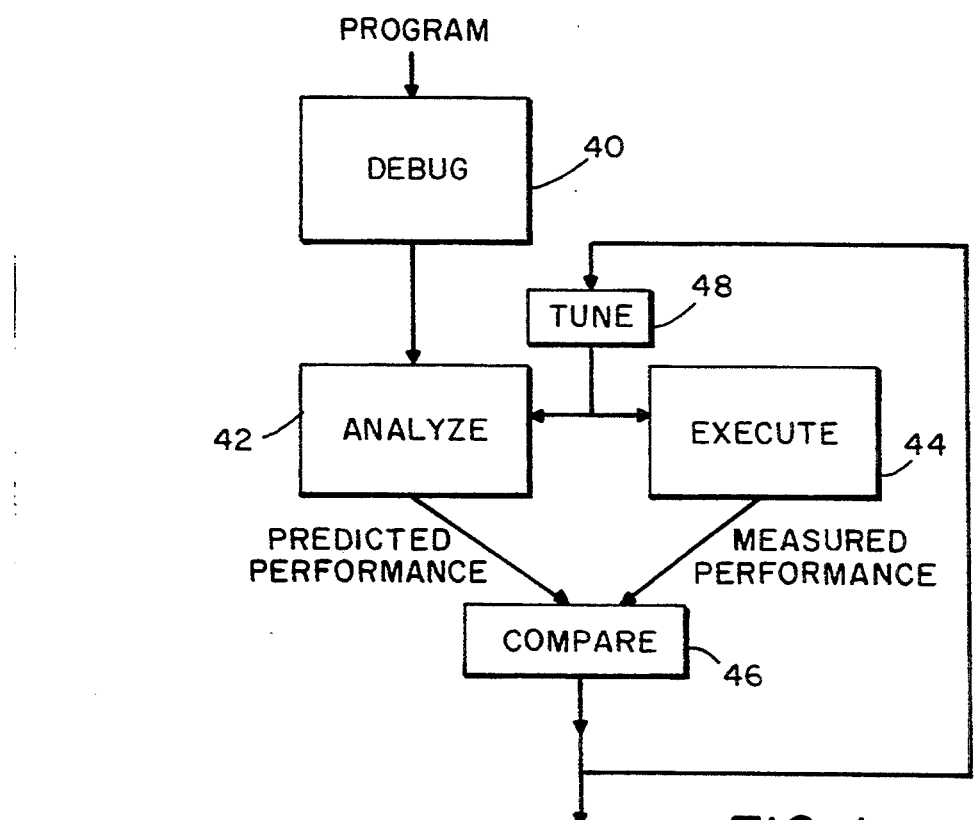
FIG. 1 shows a block diagram of the systematic approach to program development proposed by present invention.

The preferred embodiment employs an instrumentation strategy that assists the programmer in program development including debugging. In particular, the instrumentation strategy employed in the preferred embodiment aids the programmer in debugging, program analysis and performance tuning. The particulars of these advantages will be discussed in more detail below. FIG. 1 shows a block diagram of the basic program development strategy presented in the preferred embodiment. The first step in the strategy is to debug the program 40 to insure that it is operating properly. Once debugging is completed, the program is analyzed 42. The analysis process 42 involves first simulating execution of the program in an ideal environment that imposes no limitations on parallelism other than the limitations imposed by data dependencies. In this ideal environment there are an unbounded number of processing elements, and there is no communication delay. Simulation of execution in this ideal environment reveals the absolute maximum potential for parallelism of a program. The maximum potential for parallelism can then be analyzed using known techniques discussed in more detail below to determine potential parallelism in a system having finite processing capability and non-zero communication latency.

To obtain the ideal performance, the notion of an ideal step of computation is exploited by the system. An ideal step of computation represents all the instructions that may be executed at a given time as limited only by the data dependencies assuming infinite processing resources are available. The system determines the maximum potential for parallelism in the idealized environment by following a simple execution rule: for each step of computation, all the instructions that have their operands are executed. Execution proceeds on a step by step basis. The number of instructions that are executed during each step is counted and utilized to produce an idealized parallelism profile for the program. The parallelism profile is a plot of the number of instructions executed in each parallel computation step versus the step number.

Arvind, Culler and Maa have shown that good estimates of the best obtainable level of parallelism for a system having a finite number of processors with a given latency can be obtained by analysis of the ideal parallelism profile. See Arvind, D. E. Culler, G. K. Maa, "Programming for Parallelism," *Computer*, vol. 20, no. 5, May 1987. Hence, through analysis the programmer can determine the maximum attainable level of parallelism for a machine having the same number of processors and latency as the target system.

Once analysis 42 is complete, the program is actually executed, and its performance is measured 44. The performance is measured by counting the number of operations performed during each step. However, each step is defined differently from how it is defined in the ideal case. In particular, each step is defined as the number of operations being performed during a period of time specified in terms of clock cycles. For instance, a step might be defined as the number of operations performed in five clock cycles. The duration of time that constitute a step depends on the particular application and on the desired level of sampling frequency. With this approach the number of operations per step is determined by sampling the instruction counters (which will be discussed below) of each processor at the end of the specified time frame, and summing the sampled counts.

The measurement of the best possible performance for the given system as determined by the analysis step 42 and the measurement of actual performance by the given system are then compared 46. Should the comparison reveal that the program is running at an efficiency significantly below its best possible efficiency, the program is tuned 48 to attempt to boost performance. The most likely culprits of poor performance are unsatisfactory work distribution and contention. These problems can typically be addressed by proper tuning. As will be discussed in more detail below, an additional benefit of the present invention is that it provides the programmer with information that makes the task of tuning easier.

After tuning 48, the program is again analyzed 42, executed 44 and compared. These steps are repeated until a satisfactory performance is achieved. In this manner the program is systematically and properly refined.

This simulation strategy actually runs real data through the target data processing system by directly executing the program in question. This approach is in contrast to most current simulation strategies which interpret programs and then execute the programs based on the interpretation. The reason for employing such a strategy can be found in the difficulty of predicting the best attainable performance of a program for a particular machine organization absent actually executing the program in question. The sources of parallelism in any program are manifold; thus, it is exceedingly difficult to predict how each of the multiple sources of parallelism can be exploited by a machine. Accordingly, it appears there is no substitute for actually running the program on a real set of input data and then analyzing real time measurements to determine both the available parallelism and the extent of parallelism that is effectively exploited. The simulation technique of the present invention adopts this approach. Furthermore, simulation with the interpretive approach often requires a thousand times more code. The present invention only increases execution time of the code by two or three times standard execution time. The additional time incurred in this approach is attributable to the idling necessary for synchronization.

In addition to providing useful data to the programmer, the preferred embodiment provides an instrumentation strategy that is non-invasive; that is it does not alter the behavior of the system attributable to the program. In other words, the behavior attributable to the program when the system includes instrumentation is no different from the behavior when the system includes no instrumentation. Nevertheless, this non-invasive approach still provides the programmer with beneficial data. Specifically, it provides information about the timing of events rather than providing a mere statistical abstraction (such as the total number of events). As such, it provides a useful measurement that aids debugging, performance analysis and performance tuning.

Figure 2:
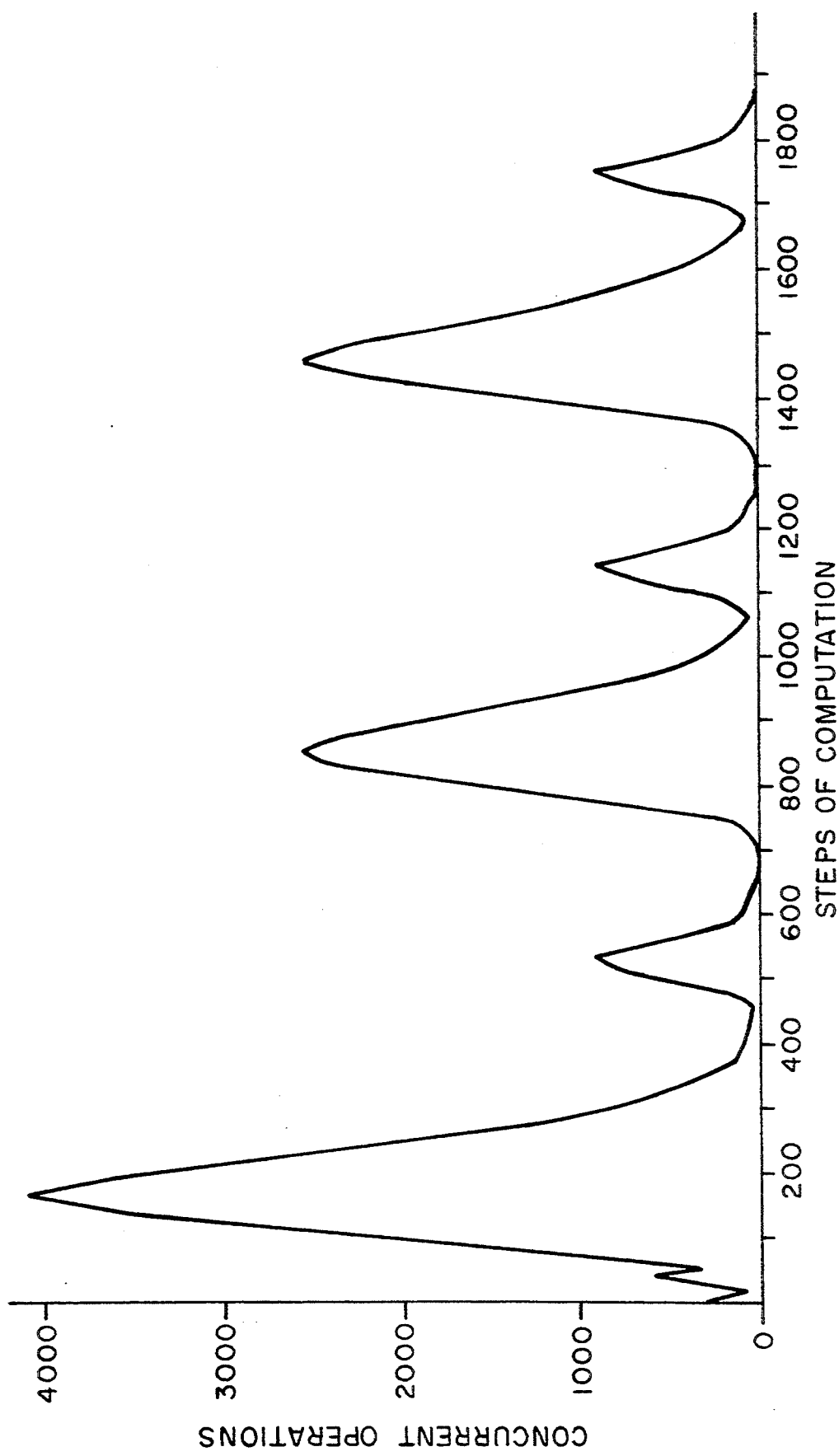
FIG. 2 shows a sample ideal parallelism profile.

FIG. 2 shows an idealized parallelism profile for a sample program. In the sample program approximately one and a half million instructions are executed. It takes the ideal machine only 1,976 clock cycles to execute the entire sample program (a processor completes an instruction every clock cycle). This number of steps of computation is denoted as the critical path because it represents the minimum number of steps in which the sample program can be executed. Therefore, the critical path represents a minimal floor which may not be surpassed because the program simply cannot be executed in fewer computational steps.

The idealized parallelism profile identifies some structural aspects of the parallelism of the sample program. For example, the smaller peaks located between the major peaks in FIG. 2 indicate that there is no significant parallelism during the portions of the program that the peaks represent. In the sample program, the smaller peaks represent code sections between iterations of an outer loop and thus, the smaller peaks indicate that there is no significant parallelism between outer loop iterations. Another important structural aspect revealed in the parallelism profile is that the potential for parallelism is quite variable. The variability suggests that reducing the profile to a single average parallelism number (akin to what is done in certain prior art techniques) is apt to make the importance of the variability much greater than is desirable.

Figure 3:
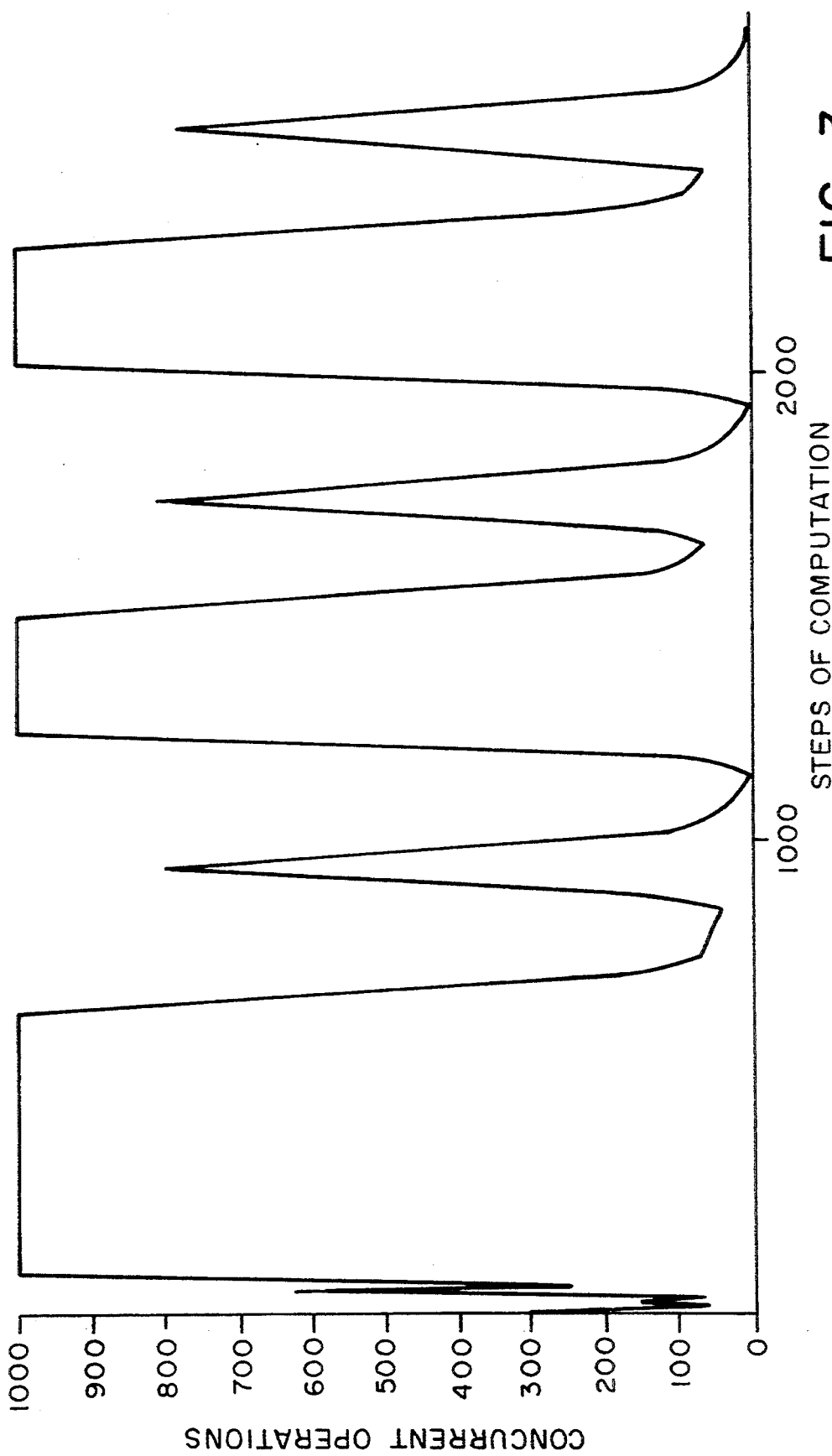
FIG. 3 shows a sample non-ideal parallelism profile.

It must be born in mind that the results achieved in FIG. 2 are for an idealized environment having an infinite number of processors with zero latency. This environment obviously does not accurately represent reality, for systems always have a finite number of processing elements, and these processors experience some degree of latency. As mentioned above, it is already known that the analyzed performance of the sample program for a system having a finite number of processing elements will have at least 1,976 computational steps. FIG. 3 shows the parallelism profile resulting when the ideal parallelism profile is analyzed for a system having a finite number of processors and non-zero latency. In particular, this parallelism profile is bounded to 1,000 processors; thus, FIG. 3 represents the best possible performance with 1,000 processors for the sample program. As can be seen, the critical path increases from 1,976 to 2,763.

In the preferred embodiment, data flow diagrams play an important role because data flow diagrams are useful tools in deriving the highest level of performance that a program may obtain. They specify only essential data dependencies that no system can remove and, therefore, are ideal candidates for expressing the theoretical limits of performance. Given that data flow diagrams reveal only essential data dependencies, they are useful tools in determining the best possible performance of a program. Thus, they are employed in the preferred embodiment of the present invention. The preferred configuration of the data flow processing system is described in copending U.S. patent application Ser. No. 07/274,498 by Papadopoulos et al.

Figure 4:
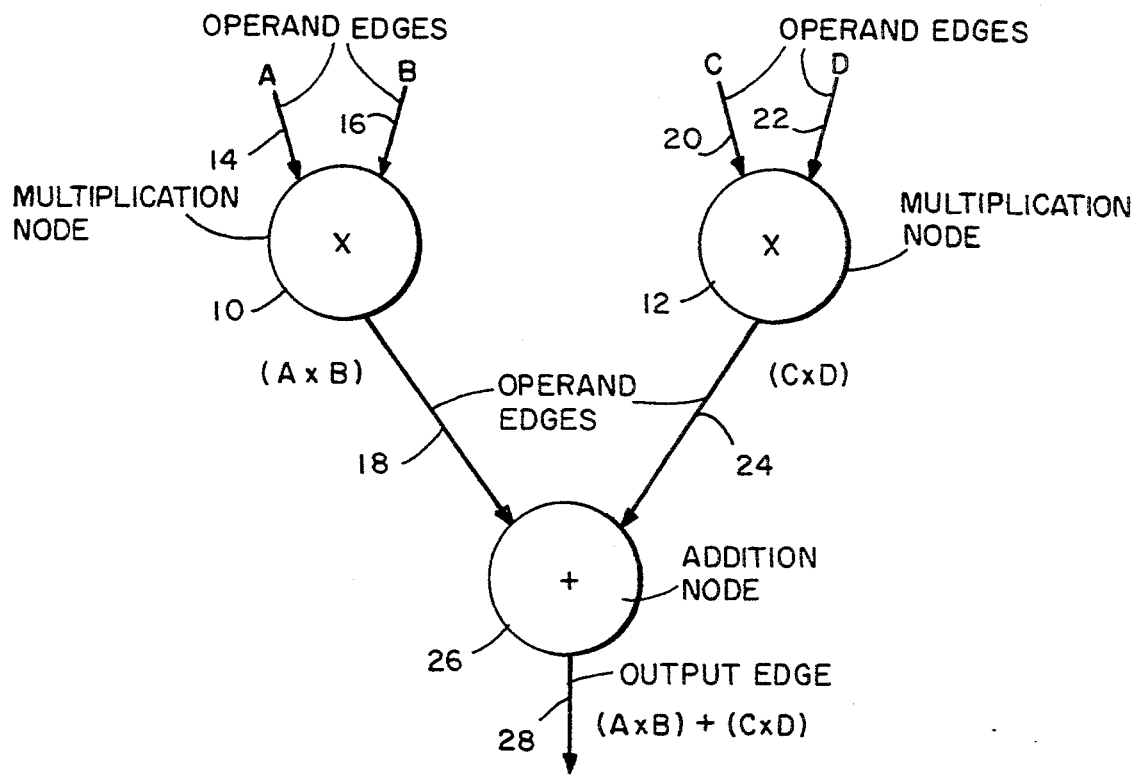
FIG. 4 shows a sample data flow graph.

A sample data flow diagram is shown in FIG. 4. Specifically, FIG. 4 illustrates a data flow diagram for $(A \times B)+(C \times D)$. The operands (i.e., A, B, C, and D) are represented as edges, and the operators (i.e., $\times$ and $+$) are represented as nodes. Node 10 represents a multiplication operation. Node 10 has two input edges 14 and 16 that represent A and B, respectively. The output edge 18 from node 10 has the value $(A \times B)$. Similarly, node 12, which also represents a multiplication operation, has input edges 20 and 22 that represent C and D respectively. Output edge 24 has the value $(C \times D)$. The output edges 18 and 24 from these nodes 10 and 12 then enter an addition node 26. The resulting output edge 28 represents $(A \times B)+(C \times D)$.

Figure 5:
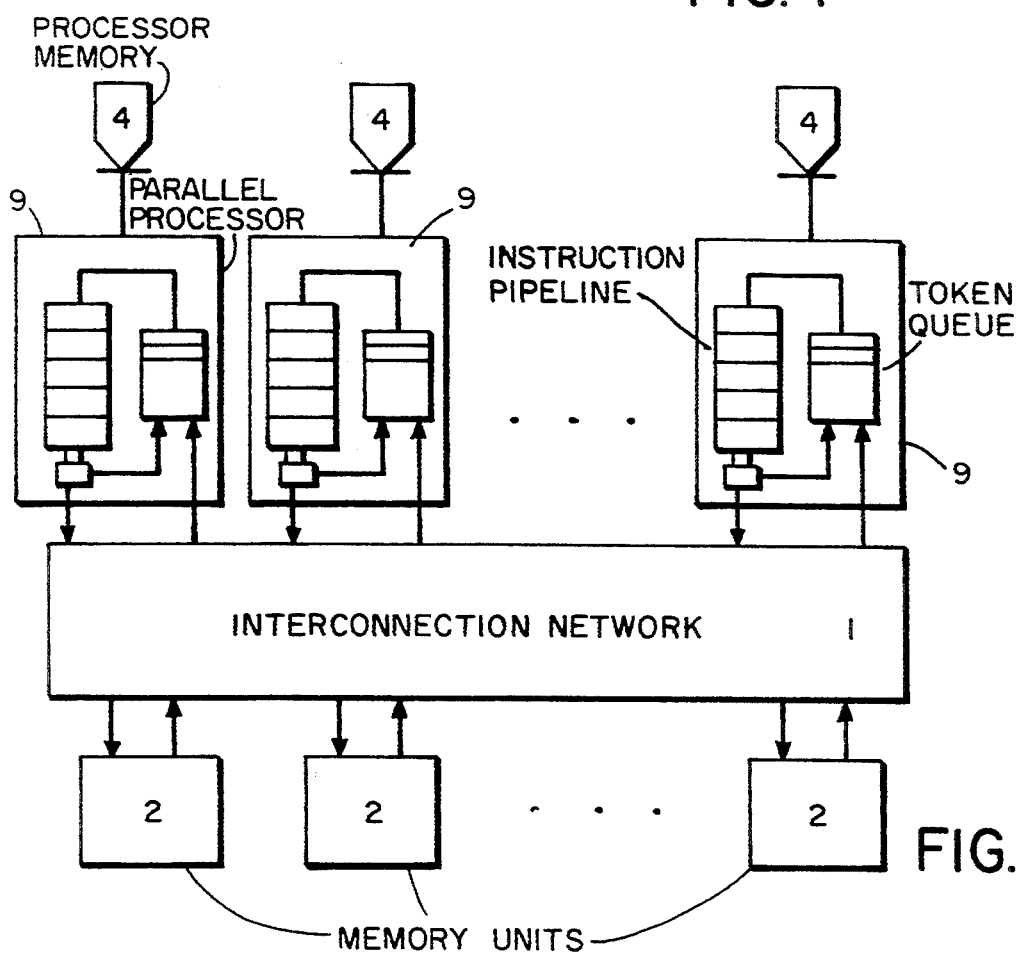
FIG. 5 shows a block diagram of the major components of the data flow processing system.

FIG. 5 shows the major components of the data flow processing system of the preferred embodiment. This data flow processing system includes a plurality of parallel processors 9 that are interconnected via an interconnection network 1. It also includes a plurality of memory units 2 that are provided for the processing elements 9. The memory units 2 are interconnected by the interconnection network 1. The interconnection network 1 allows each processing element 9 to communicate with any other processing element 9 as well as with any memory unit 2. In addition, a separate portion of memory 4 is associated with each processing element 9. This memory 4 includes activation frames having presence bits. Activation frames are discussed in more detail below.

The data flow diagrams that the preferred embodiment executes are comprised of edges and nodes such as shown in FIG. 4. The edges represent operands and the nodes represent operations to be performed on the instructions. The operands control scheduling of the execution of instructions. In particular, an instruction is executed only when all of the operands of the instruction are available. A problem posed by such a scheduling scheme is that operands usually do not become available at the same time. Typically, one operand arrives before the others. Hence, to operate effectively the system must have a means of holding the early arriving operands while waiting for the remaining operands to arrive. In the preferred embodiment, activation frames provide such a mechanism. The activation frames in memory 4 are able to indicate the empty and presence states of each of their memory locations. These activation frames are held within the memory 4 spaces assigned to the various processing elements 9. Also stored in these memory 4 spaces are sections of code to direct operation of the processing elements 9.

Figure 6:
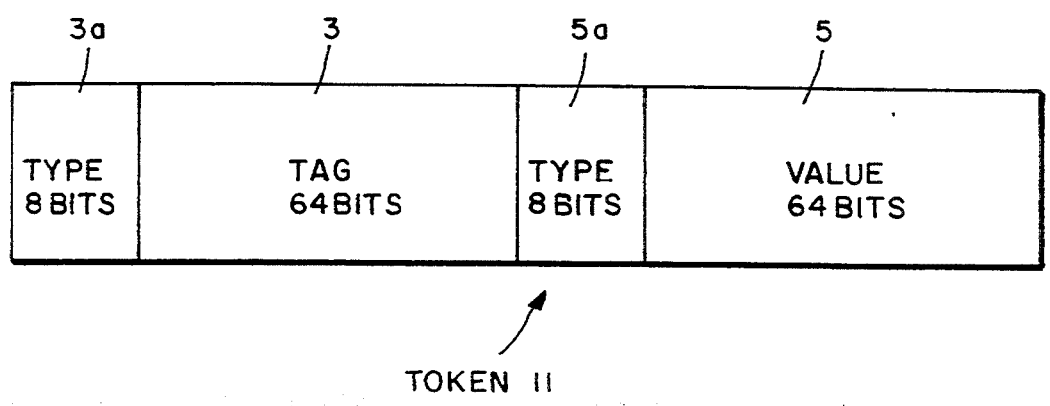
FIG. 6 depicts a token and its related fields.

The data flow processing system is preferably a special variety of data flow processing system known as a tagged token processing system. It operates on data structures known as tokens that generate activities when processed by the processing elements 9. As FIG. 6 illustrates, these tokens 11 are comprised of a tag field 3 and a value field 5. Each of these fields are 64 bits in length. In addition, type fields 3a and 5a are provided for the tag field 3 and value field 5, respectively. The value field 5 holds a data value. The tag field 3, in contrast, holds a first pointer to the memory address in the assigned memory 4 where the instruction to be executed is held. The tag 3 also holds a second pointer to an activation frame. The fetched instruction contains an offset that is used to offset the second pointer so as to specify the memory location within an activation frame where the operands of the instruction are matched.

Each processing element 9 maintains at least one local token queue in which it stores a plurality of tokens that it processes. Each processing element 9 clocks in a new token from the at least one token queue into the processing element 9 every clock cycle of a system clock. Within the processing element 9, execution is attempted of the instruction identified by the first pointer of the token 11. Often, however, to complete execution of an instruction such as a fetch instruction, it is necessary to access a memory unit 2. In such cases, the processing element 9 generates a new token that it sends to the appropriate memory unit 2. Once generated, new tokens exit the processing elements 9 and travel across the interconnection network 1 to the appropriate memory unit 2.

Figure 7:
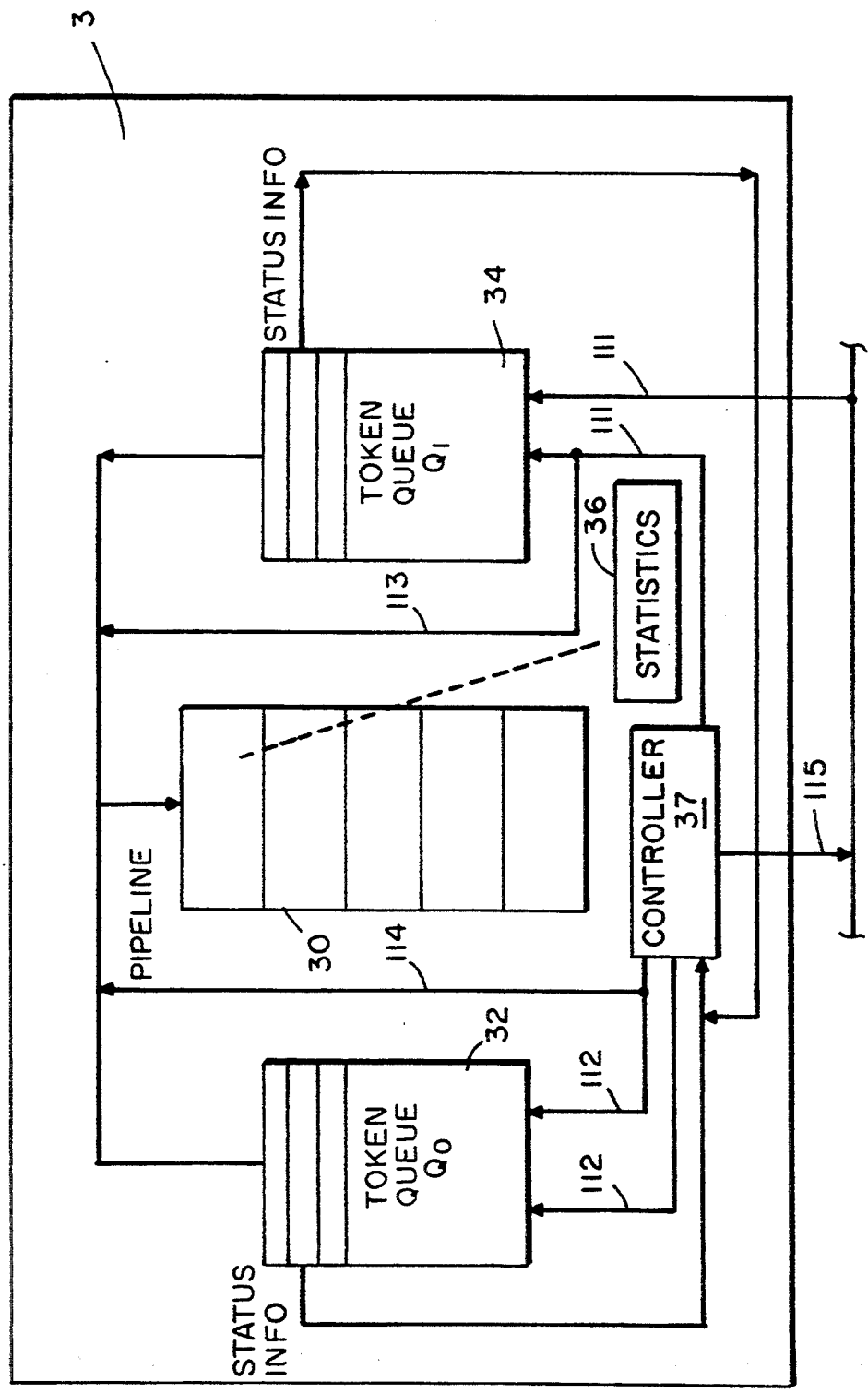
FIG. 7 is a detailed view of a processing element and its related token queues.

In order to implement the simulation techniques described above, a preferred embodiment has certain hardware embellishments. In particular each processing element 9 includes not one but two token queues 32 and 34 (FIG. 7). This particular hardware configuration allows this embodiment to efficiently implement discrete parallel computation steps which, in turn, facilitate simulation of idealized execution.

Each processor 9 also includes a statistics unit 36 which counts the occurrences of predefined events in the processor. The count may be stored in registers or counters or they may merely be stored in memory space. The physical makeup of the statistics unit 36 is dependent on the type of statistics that are being kept. The statistics unit 36 can be periodically sampled by a host processor. The host processor acts as an information center that gathers the statistics from all the processors.

As noted above, to perform the simulation of the ideal environment, this embodiment performs a series of parallel steps of computation. At the beginning of each parallel step of computation, a first token queue 32 contains all the tokens that are produced for the particular step of computation. In the first step of computation the tokens in the first token queue 32 are provided by the compiler. For all subsequent steps, the tokens for the next step of computation are those generated by the previous step of computation. To initiate a step of computation, each processing element 9 begins consuming the tokens held in its respective first token queue 32. Each processor is designed so that it will continue processing tokens until the token queue 32 is empty. Any result tokens generated by the processing are stored in the second token queue 34. It is certain that the system will not dequeue the second token queue 34 because a force-to-empty control signal is asserted for that queue 34. This signal makes the queue 34 appear as if it is empty, and as such, tokens are not dequeued by the processor. Other control signals for the processing elements include a force-to-enqueue signal that forces data into the queue and a swap line that causes a swap of the roles of the two queues 32 and 34. The force-to-enqueue signal is used in conjunction with the force to empty signal to fill the chosen queue with tokens for the next step of computation. In the above example, the second queue 34 is the chosen queue.

The processing of the tokens from the first token queue 32 continues until all processors have processed all tokens in their first token queues 32. The means for indicating that all tokens in a first token queue 32 have been processed may vary. One approach is to maintain pointers to the queue that indicate when it is empty. An alternative approach is to insert a barrier token that has special properties. This barrier token is inserted at the end of the tokens of each step. As such, it is not processed until all the other tokens in a step have begun being processed.

The barrier token serves several functions. First, it tells the processor 30 to stop dequeueing the first queue 32. This is achieved by removing the barrier token from the first queue 32 so that the queue is empty. Second, a signal is sent out to a host processor. This signal indicates that it is time for the host processor to sample the statistics accumulated in the statistics box 36. Third, it tells the processor to idle until a revival signal is sent from the system. Since both of the queues appear empty there appears to be nothing to dequeue so the processor idles. Fourth, a new barrier token is added to the end of the second queue 34. Fifth, the control signal to the second queue 34 is changed to indicate that the queue has tokens to be processed, and the processor begins dequeuing tokens again, but from the second queue 34. A force-to-enqueue control signal is asserted on the first queue 32 so that output tokens are enqueued into the first token. Moreover, the force-to-empty signal is asserted on the first queue 32 so that it does not provide token during this step of computation.

As is apparent from the above discussion, a means is provided in the system for directing the output tokens as they exit the pipeline 30. This means is a controller 37. The controller 37 knows the current status of the queues (see status lines in FIG. 7). The controller 37 reads designated bits of each output token that indicate the destination of the token. Thus, the bits indicate whether a token should follow a path 111 to the second queue 34 or a path 112 to the first queue 32. Similarly, they indicate whether an output token should follow paths 113 or 114 which bypass the queues or should follow a path 115 to the interconnection network 1. The controller 37 is able to recognize the barrier token. Furthermore, the controller is able to recognize tokens generated in processing the system routine initiated by the barrier token. Those system routine tokens are not enqueued but are returned directly to the input of the pipeline via path 113 or 114.

The result of the barrier token is that the roles of the token queues 32 and 34 are reversed during the subsequent computational step. Specifically, the tokens are processed from the second token queue 34 rather than from the first token queue 32 (as in the previous step). Any result tokens generated are placed into the first token queue 32. There is, therefore, a toggling of token queues for each step of computation. This is partially achieved by exerting the swap control line. The swap line causes the force-to-empty and force to enqueue signal to be asserted at the first token queue 32 and to no longer be asserted at the second token queue. By being configured in this manner, the preferred embodiment can perform as many computational steps as are required by a program. Furthermore, the present system can account for interprocessor communication by sending result tokens destined for another processing element to a token queue in the other processing element. This forwarded token is queued along with other tokens generated by the destination processing element and it is processed during the next computation step.

This approach enables a programmer to know the number of instructions that are executed during each step of computation. Moreover, this approach enables the programmer to discern which processing elements perform a large number of operations and which perform a small number of operations. The ability to break the program down into steps of computation and to perform each step separately, allows the preferred embodiment to simulate the idealized environment without concern for actual processing time and latency.

In an alternative embodiment, only one token queue is used for tokens of the user program. In this embodiment, the barrier tokens are inserted between the tokens of different steps of computation. The barrier is processed to a large extent as previously described. It causes a signal to be sent to the host processor to initiate sampling of the statistics units and causes a force-to-empty signal to be asserted on the queue so that the queue is no longer dequeued. Output tokens produced in response to tokens in the pipeline that are ahead of the barrier token are allowed to be enqueued, but tokens resulting from processing of the barrier token are not. Where a second queue is available, it may serve as a system queue which holds tokens generated in processing of the barrier tokens. The processor idles after processing the routine initiated by the barrier token and waits to be revived. Output tokens are no longer enqueued. Upon revival, a barrier token is added to the end of the queue, and the processor receives a control signal that removes the force-to-empty signal so that tokens in the queue can be processed.

The barrier token approach may also be used for instrumentation during actual execution. In accordance with this approach, barrier tokens are inserted with the tokens in the queues so that periodically the instruction counters are sampled. The processing elements, however, do not idle in this approach. By using this alternative approach, the same results are achieved using the previously discussed clock dictated approach.

Yet another use for the barrier tokens is to use them as tracers. When used in this capacity, the barrier tokens are inserted at similar points of the ideal execution and the real execution. They are eventually processed in both instances, and they cause the counters to be sampled by the system. The resulting data creates a picture of where in the real and simulated executions the barrier token is processed. This picture may often be useful to the programmer.

The present invention provides a major benefit in debugging programs. Specifically, computation is stopped following completion of the current step whenever an error is detected. Debugging is made easier than it would be without such an approach. In this approach, the programmer can examine the current state of the machine at the end of the computation step in which the error occured for clues as to what caused the error.

To better understand the great benefit the present system provides a programmer in debugging a program, it is first necessary to clarify what is meant by determinate execution. In the present context, determinate execution refers to execution that is time independent. Non-determinate execution, therefore, refers to execution that is time dependent. A typical example of non-determinate execution occurs when a read and a write to the same location are performed in parallel. If the program that encodes the read and write is executed several times, it is likely that the order in which the read and the write are performed will differ for given iterations of execution.

Problems arise when an error occurs in portions of the code that are non-deterministic. For instance, suppose that in the above example the read occurs before the write occurs. The system then reads a nonsensical value from the memory location. Matters are further complicated by this error only arising in certain executions of the program. By forcing the code to be determinate, such problems are overcome and errors that arise always occur in the same computational step. The present system forces a determinate approach because data flow languages guarantee determinacy. As a result, errors in programs executed on the system of the present invention are certain to always arise in the same computational steps for different executions of the program. However, in normal operation different portions of each ideal computational step may occur at different times, so the time of processing of any token and, thus, the actual state of the machine with an error may be indeterminate. By forcing execution by one computational step at a time, the state of the entire machine at the occurrence of an error becomes determinate and the task of debugging is simplified. Debugging can be performed a computational step at a time without propagation of errors through plural steps. Further, due to the instrumentation, relevant data such as current values of variables is available to the programmer to aid him in his task of debugging.

The benefits of this instrumentation approach include performance tuning and program analysis as previously mentioned. A further embellishment may be included in a preferred embodiment to enhance these benefits. In particular, a subset of instructions can be encoded with a color field that identifies a class of instructions. This color field is an additional field added on to the instructions. When such a color coded instruction is executed, it triggers a corresponding counter in the statistics unit 36. Multiple colors of instructions may be counted. For example, suppose one class of instructions is colored green and another class of instructions is colored orange. Separate green and orange counters are included in the statistics unit and green and orange counters count the number of instructions their respective colors that are executed.

In accordance with an alternative embodiment tokens are colored rather than the instructions. Specifically, color is encoded in the type field 3a of a token's tag 3. As a result, the color may be dynamically allocated for each token. In the preferred embodiment, three of the bits in the tag field 3a encode color. This configuration provides for eight possible colors. The system has sixty four statistics registers for holding instruction counts. Given that eight colors are available, it follows that eight different instruction types may also be specified to the statistics unit. A register may, thus, be dedicated to count each instruction type of each color. For example, each floating point operation on a token of a particular color would increment the value in a particular statistics register. Other mixes of instruction types and colors are obviously possible, and the present invention is intended to encompass such mixes.

The counter mechanism provides a vastly greater quantity of information to the programmer for tuning and analysis than provided by a single counter that counts all types of instructions. For instance, with the current approach, a programmer can display the floating point operations that are performed per step and can identify the interconnection network traffic during execution. Moreover, different phases of the program may be assigned different colors so that the progress of the numerous phases may be tracked and analyzed. The potential utility of the colored phase information may be enhanced by plotting the various colors in the parallelism profile.

In sum, the present invention provides an extremely efficient instrumentation strategy. The instrumentation is achieved with minimal hardware embellishments using the same mechanisms that process tokens. Moreover, the present invention produces a system that allows for easy and systematic debugging. Bearing in mind the extreme difficulty typically experienced by programmers in attempting to debug concurrent code and the current shortage of quality software for concurrent systems, one begins to realize the magnitude of this benefit.

While the invention has been particularly shown and described with reference to preferred embodiments thereof. It will be understood that those skilled in the art that various changes in form and details may be made without departing from the spirit and scope of the invention as defined in the appended claims.

I claim:

1. In a data processing system comprising at least one processor for executing instructions stored in memory, execution of instructions being initiated by the processing of tokens which carry operands, an instruction being executed only after all required operands are available, and the execution of some instructions generating new tokens to be processed in order to initiate execution of new instructions, a method of determining a maximum level of parallel execution of instructions that is possible with execution of a program comprised of a plurality of instructions, said method comprising the steps of:

a) simulating execution of the program in multiprocessors having unlimited processing capability with respect to the program by executing the program in the at least one processor one program step at a time, each program step after a first program step processing all tokens generated in a previous program step, each program step comprising:
  processing with the at least one processor all tokens which are available at the start of the program step, the processing of the tokens initiating execution of all of the executable instructions whose execution is free of dependency upon unavailable operands; and
  storing new tokens generated during the program step for processing during a subsequent program step; and
b) for each program step, counting and recording a number of instructions that are executed during the program step to produce a parallelism characteristic of the program.

2. A method as recited in claim 1 wherein the simulating step simulates the data processing system as having no delay in communications among a plurality of parallel processors.

3. A method as recited in claim 1 further comprising the step of plotting the number of instructions completed during each program step versus the number of the program step to produce a graphical representation of performance of the simulated second data processing system assuming an infinite number of parallel processors for comparison to actual performance with a finite number of parallel processors.

4. A method as recited in claim 1 wherein the first and second data processing systems are data flow processing system.

5. A method of determining a maximum level of parallel execution of instructions that may be achieved when a program is executed by a data processing system having at least one processor, said program being comprised of a plurality of instructions stored in memory, execution of instructions being initiated by the processing of tokens which carry operands, an instruction being executed only after all required operands are available, and the execution of some instructions generating new tokens to be processed in order to initiate execution of new instructions, said method comprising the steps of:

a) simulating execution of the program by multiprocessors having unlimited processing capability with respect to the program by executing the program in the at least one processor in program steps, each program step after a first program step processing all tokens generated in a previous program step, each program step comprising:
  processing with the at least one processor all tokens which are available at the start of the program step, the processing of the tokens initiating execution of a set of all executable instructions whose execution is free of dependency upon unavailable operands; and
  storing new tokens generated during the program step for processing during a subsequent program step;
b) counting a number of instructions executed in each program step;
c) recording the numbers of instructions counted in the counting step to generate a parallelism characteristic of the program; and d) analyzing the number of instructions to derive the maximum level of parallel execution of instructions achievable by a finite number of processors.

6. A method as recited in claim 5 wherein the data processing system is a data flow processing system.

7. A data processing system for determining a maximum level of parallel execution of instructions achievable upon execution of a program, said program being comprised of a plurality of instructions stored in memory, the execution of said instructions being initiated by processing of tokens which carry operands, an instruction being executed only after all required operands are available, and the execution of some instructions causing the generation of new tokens to be processed in order to initiate execution of new instructions, said data processing system comprising:

a) at least one processor for executing the program a program step at a time to simulate execution of the program in multiprocessors with unlimited processing capability with respect to the program, each program step after a first program step processing all tokens generated in a previous program step, execution of a program step comprising:

processing with the at least one processor all tokens which are available at the start of the program step, processing of the tokens initiating the execution of all executable instructions whose execution is free of dependency upon unavailable operands;

storing tokens generated during the program step for processing during a subsequent program step;

b) means for counting and recording a number of instructions executed at each program step to produce a parallelism characteristic of the program; and c) in each processing element, at least one token queue for storing tokens whose processing initiates execution of instructions of the program step and tokens whose processing initiates execution of instructions of the subsequent program step.

8. A data processing system as recited in claim 7 wherein the data processing system comprises a data flow processing system.

9. A data processing system as recited in claim 7 wherein during execution, a first token queue stores tokens for the step being executed and a second token queue stores tokens for the subsequent step to be executed.

10. In a data processing system having at least one processor, a method of determining a maximum level of parallel execution of instructions that may be achieved when a program is executed, said program being comprised of a plurality of instructions stored in memory, execution of instructions being initiated by the processing of tokens which carry operands, an instruction being executed only after all required operands are available, and the execution of some instructions generating new tokens to be processed in order to initiate execution of new instruction, the at least one processor comprising at least one token queue for storing tokens, said method comprising the steps of:

a) for the at least one processor, storing tokens whose processing initiates execution of a program step in one of its at least one token queues, each program step after a first program step processing all tokens generated in a previous program step, in the at least one processor, processing all tokens which are available in the at least one token queue at the start of the program step, the processing of the tokens initiating execution of all executable instructions initiated by tokens whose execution is free of dependency upon unavailable operands, and storing tokens generated during the program step for processing during a subsequent program step;

b) counting a number of instructions completed during the program step and associating the number with the program step; and c) repeating steps a and b for subsequent program steps to generate a parallelism characteristic for the program.

11. A method as recited in claim 10 wherein the data processing system is a data flow processing system.

12. A method as recited in claim 10 further comprising the step of adjusting the parallelism characteristic according to processing limitations of the plurality of parallel processors to derive the maximum achievable level of parallelism that may be achieved in executing the program with the plurality of parallel processors.

13. A data processing system for determining a maximum level of parallel execution of instructions of a program which is achievable when the program is executed, said program being comprised of a plurality of instructions stored in memory, execution of the instructions being initiated by the processing of tokens which carry operands, an instruction being executed only after all required operands are available, and the execution of some instructions generating new tokens to be processed in order to initiate execution of new instructions, said data processing system comprising:

a) at least one processor for processing tokens and executing instructions to execute the program in program steps, each program step after a first program step processing all tokens generated in a previous program step, the at least on processor processing all tokens which are available at the start of the program step, the processing of the tokens initiating execution of all executable instructions whose execution is free of dependency upon unavailable operands, and storing tokens generated during the program step for processing during a subsequent program step, the at least one processor comprising a means for counting a number of instructions that are executed during each program step; and b) at least one pair of token queues for holding tokens to be processed by the at least one processor wherein, during each program step, tokens held in one of the pair of token queues are processed until the token queue is empty, and new tokens generated during the program step are stored in the other token queue of the pair.

14. A data processing system as recited in claim 13 wherein the data processing system comprises a data flow processing system.

15. In a data processing system having at least one processor, a method of determining a maximum level of parallel execution of instructions of a program which is achievable when the program is executed, said program being comprised of a plurality of instructions stored in memory, execution of the instruction being initiated by the precessing of tokens which carry operands, an instruction being executed only after all required operands are available, and the execution of some instructions generating new tokens to be processed in order to initiate execution of new instructions, said data processing system comprising, for the at least one processor, a pair of token queues for holding tokens to be processed by the at least one processor, said method comprising the steps of:
a) filling a first token queue of the pair of token queues with tokens of a program step, each program step after a first program step processing all tokens generated in a previous program step, processing with the at least one processor all tokens in the first token queue which are available at the start of the program step, the processing of the tokens initiating execution of all executable instructions initiated by tokens whose execution is free of dependency upon unavailable operands, and storing new tokens generated during the program step in a second token queue for processing during a subsequent program step;
b) counting a number of instructions executed during the program step and associating this number of instructions with a number of the program step; and
c) repeating steps a and b for subsequent program steps to generate a parallelism characteristic for the program, the first token queue of a program step being the second token queue of the next succeeding program step and the second token queue of a program step being the first token queue of the next succeeding program step.

16. A method as recited in claim 15 wherein the data processing system is a data flow processing system.

17. A method as recited in claim 15 further comprising the step of adjusting the parallelism characteristic according to processing limitations of the plurality of parallel processors to derive the maximum achievable level of parallelism that may be achieved in executing the program with the plurality of parallel processors.

18. In a data processing system having at least one processor, a method of executing a program to facilitate debugging of the program, said program being comprised of a plurality of instructions stored in memory, execution of the instructions being initiated by the processing of tokens which carry operands, an instruction being executed only after all required operands are available, and the execution of some instructions generating new tokens to be processed in order to initiate execution of new instructions, the at least one processor comprising at least one token queue for storing tokens, said method comprising:
a) storing tokens of a program step in the at least one token queue, each program step after a first program step processing all tokens generated in a previous program step, processing all tokens which are available at the start of the program step, the processing of the tokens initiating execution of all executable instructions initiated by tokens whose execution is free of dependency upon unavailable operands, and storing tokens generated during the program step for processing during a subsequent program step;
b) if an error occurs, halting execution of the program after the program step and determining the source of the error; and
c) otherwise, continuing execution by processing tokens of a next program step.

19. A method as recited in claim 18 further comprising the step of accumulating statistics in a memory element during processing of the tokens.

* * * * *